United States Patent [19]

Kondo

[11] Patent Number: 5,136,583
[45] Date of Patent: Aug. 4, 1992

[54] DATA-COMMUNICATION METHOD FOR LOOP-TYPE NETWORK HAVING PORTABLE SLAVE STATIONS CONNECTABLE TO ADDRESSABLE JUNCTION BOXES PERMANENTLY CONNECTED IN THE NETWORK

[75] Inventor: Haruhiko Kondo, Aichi, Japan

[73] Assignee: Mitsubishi Denki K.K., Tokyo, Japan

[21] Appl. No.: 537,722

[22] Filed: Jun. 14, 1990

[30] Foreign Application Priority Data

Sep. 5, 1989 [JP] Japan .................. 1-229644

[51] Int. Cl.⁵ .................. H04J 3/02
[52] U.S. Cl. .................. 370/85.15; 370/85.12; 340/825.05
[58] Field of Search .................. 370/85.15, 85.5, 85.12, 370/85.7, 85.1, 92, 93, 94.1, 94.2, 94.3, 16, 16.1, 110.4; 371/11.1, 11.2, 8.1, 8.2; 340/825.05

[56] References Cited

U.S. PATENT DOCUMENTS

| | | | |
|---|---|---|---|
| 4,575,846 | 3/1986 | Yokomizo | 370/85.5 |
| 4,701,630 | 10/1987 | Annunziata et al. | 370/85.1 |
| 4,706,245 | 11/1987 | Suzuki et al. | 370/110.4 |
| 4,779,261 | 10/1988 | Yamagishi et al. | 340/825.05 |
| 4,811,009 | 3/1989 | Orimo et al. | 370/85.12 |
| 4,881,220 | 11/1989 | Yomogida et al. | 370/16 |
| 4,905,230 | 2/1990 | Madge et al. | 370/85.5 |
| 4,937,811 | 6/1990 | Harris | 370/85.15 |
| 4,963,763 | 10/1990 | Minagawa et al. | 340/825.05 |
| 4,982,185 | 1/1991 | Holmberg et al. | 340/825.05 |

FOREIGN PATENT DOCUMENTS

| | | | |
|---|---|---|---|
| 0079436 | 4/1988 | Japan | 370/85.15 |
| 0119347 | 5/1990 | Japan | 370/85.15 |

*Primary Examiner*—Douglas W. Olms
*Assistant Examiner*—Dang Ton
*Attorney, Agent, or Firm*—Sughrue, Mion, Zinn, Macpeak & Seas

[57] ABSTRACT

A method and apparatus for communicating between a host station and a plurality of slave stations, each detachably connected to a junction box permanently affixed at a node in a loop-type network. Each junction box has a variable code input which may be used as the system address for any slave station connected at that particular node. The system address may be input by the junction box into a predetermined location in the system transmission frame for access by the attached slave station or may be input separately by the junction box into the attached slave station in order to permit the slave station to read information in a particular slot of the transmission frame or write information to such slot.

6 Claims, 6 Drawing Sheets

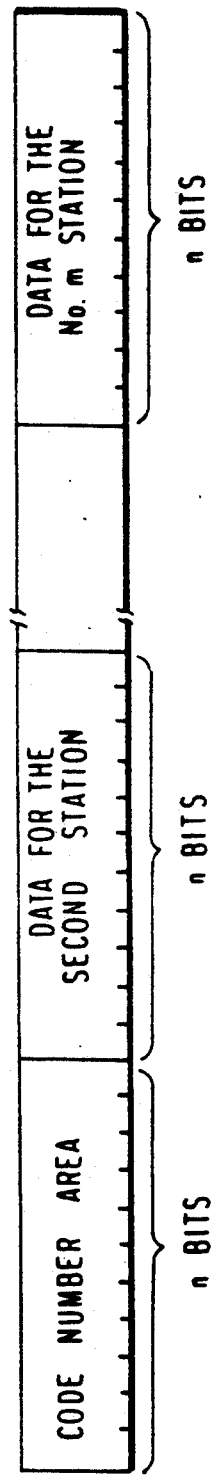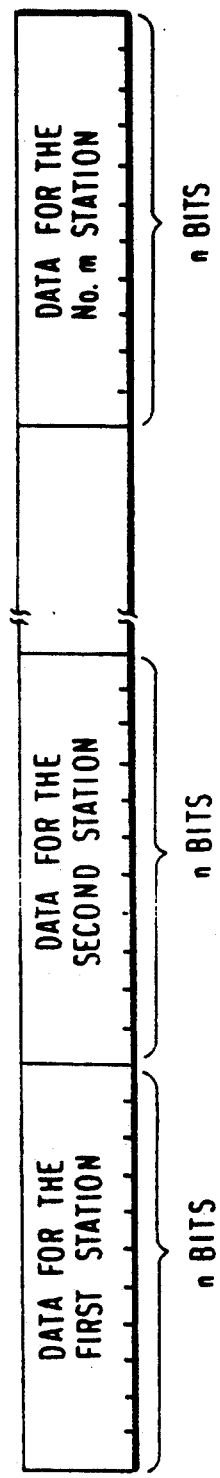

DATA-COMMUNICATION METHOD FOR LOOP-TYPE NETWORK HAVING PORTABLE SLAVE STATIONS CONNECTABLE TO ADDRESSABLE JUNCTION BOXES PERMANENTLY CONNECTED IN THE NETWORK

BACKGROUND OF THE INVENTION

1. Field Of The Invention

The present invention relates to a data-communication method for carrying out data communications between a host station and one or more slave stations, all connected in a loop-type network configuration by data transmission lines.

2. Description Of The Prior Art

FIG. 5 is a block diagram of the architecture of a conventional loop-type data-communication system. In that system, a host station 1 is connected to a plurality of slave stations, which may be portable data-communication terminals 3A, 3C, 3D (each called a "slave station" hereinafter). The slave stations are intended to be attachably and detachably connected into the system. Accordingly, the continuity of the loop type architecture is maintained by having a plurality of junction boxes 2A, 2B, 2C and 2D permanently connected with the host 1 in a loop by a plurality of data transmission lines or cables 4A through 4E. Thus, if a slave station is not connected to o a junction box, as seen with respect to box 2B, the communication loop remains intact. Also, any of the slave stations 3A, 3C and 3D shown in the figure may be detachably connected into the system by plugging it into any other junction box, as seen in the Figure for junction boxes 2C and 2D.

FIG. 6 is a block diagram showing the data-communication equipment, comprising a junction box 2A connected via plugs P1, P2 to a slave station 3A and via switch 6 to transmission lines 4A and 4B, that would be employed when a conventional data-communication method is applied to the system of FIG. 5. In FIG. 6, a connection detecting circuit 5 is located within the junction box 2A and detects the connection of the slave station to the junction box 2A. Switching device 6 is controlled by an output from the connection detecting circuit 5. Switching device 6 has an actuator 6a operatively associated with armature 6b which can electrically connect an input transmission line 4A at terminal C to either one of terminals A and B. Terminal A is connected to output transmission line 4B going to the next station in the loop. Terminal A is also connected via plug P2 and line 42 to the output of a communication I/F circuit 7 accommodated within the slave station 3A. Terminal B is connected via plug P1 and line 40 to the input of I/F circuit 7. The communication I/F circuit 7 converts serial data on the transmission line 4A into parallel data for processing at terminal 3A and converts parallel data from station 3A into serial data for transmission to the host station 1 via transmission line 4B. A dip switch 8 is connected to the I/F circuit and is settable by an operator to input a predetermined code number that uniquely identifies the slave station 3A.

FIG. 7 is a block diagram of the internal structure of communication I/F circuit 7. In FIG. 7, the serial data transmitted from the host 1 on line 4A, if directed by switch 6 to terminal B, is placed on transmission line 40 for input to I/F circuit 7 via plug P1. The serial data signal output by I/F circuit 7 and directed to host 1 or a subsequent station is placed on line 4B via plug P2, line 42 and terminal A of switch 6.

Referring again to the serial input to the I/F circuit 7 on line 40, receiving circuit 11 is operative to shape the input waveform, comprising the serial data signal transmitted from a previous station, and pass the shaped serial waveform data to counting circuit 12 for counting the number of bits in the serial data signal. The bit count is performed in a conventional manner and, as it is conducted, the current count is output on line 44 to comparing circuit 14. The serial data is not changed by the counting circuit 12 but is passed on to data decoding circuit 15 without modification. The code number set in dip switch 8 is input to computing circuit 13, which computes a code value based on the following formula:

$$\text{code value} = (\text{code number} - 1) \cdot n + 1 \tag{1}$$

where n is the number of bits allotted to each station.

The comparing circuit 14 receives the current count number from the data counting circuit 12 and the code value computed by the computing circuit 13 in accordance with equation (1) and compares the two values. If there is no identity, the data stream simply passes through units 15, 20 and 21 and is transmitted to the next station. At the moment that there is an identity between the two values, a coincidence signal is sent to the data decoding circuit 15 on line 45 and to the data encoding circuit 20 on line 43. Data decoding circuit 15 receives the serial data transmitted via receiving circuit 11 and counting circuit 12, and detects n bits in sequence and converts them to parallel data. The parallel data assembled by decoding circuit 15 is output to two destinations. The first and usual destination is data encoding circuit 20, subsequently described. The second destination, upon the occurance of the coincidence signal, is output circuit 16, which shapes the parallel data and passes the data to output I/F circuit 17, for changing the level of the signal outputted by the output circuit 16, and outputting the signal to an internal bus (not illustrated) of the slave station. The slave station internal bus will join a variety of slave station components that are responsive to, and productive of, parallel data information. The details thereof are not relevant to the present invention and need not be disclosed further.

Input I/F circuit 18 is connected to the slave station internal bus and receives signals thereon that were outputted by the slave station components and changes the level of those signals. Input circuit 19 sends the level adjusted signals from the input I/F circuit 18 to data encoding circuit 20. The data encoding circuit 20 will convert the parallel data signal from the input circuit 19 to a serial data signal. The data encoding circuit 20 also receives the parallel data output from data decoding circuit 15 and the coincidence signal from comparing circuit 14, via line 43, indicating identity of the bit count from counting circuit 12 and a code value from computing circuit 13 based on the output of dip switch 8. Encoding circuit 20 will effectively output serial data corresponding to the data received from either decoder 15 or input circuit 19, depending on the state of the coincidence signal 43. Transmitting circuit 21 will synchronize the serial data from encoding circuit 20 with the serial data signal received from the host or the previous station. The synchronized serial data will be passed via line 42 to the next station.

FIG. 8 shows a transmission frame of the serial data signal transmitted from the host station. The transmission frame comprises m time slots, one per station, each slot having n bits. The data destined for slave stations in the system appear sequentially in the frame, ordered from a first station to the mth station. The frame comprises a serial data column of n×m bits and is transmitted from the host station 1 to the plurality of slave stations in the system once every communication cycle. The host knows the order in which each slave station appears in the loop and the slot number to which it is assigned, and will read from and write to the frame accordingly. The frame will be distributed to all of the slave stations through the transmission lines and the data for any given station will be selected from the frame on the basis of bit count. That is, station "m" simply extracts the portion of the bit stream destined for it by counting the number of bits received and, assuming ar allocation of "n" bits per station, will extract bits m·n+1 through (m+1)n (assuming a leader n bits wide precedes the data stream).

The operation of the equipment employing the conventional data-communication method, relevant as background to the present invention, may be explained with reference to FIGS. 5 through 8. Referring initially to FIG. 6, when slave station 3A is not connected to junction box 2A, the armature 6b of switch 6 in that junction box is connected between terminal C and terminal A so that the transmission line 4A can be connected directly to the transmission line that is connected to the next junction box 2B. However, when slave station 3A is connected to the junction box 2A, the connection detecting circuit 5 is operated so that the switch 6 connects contact point C to contact point B, as shown in FIG. 6. When this connection is complete, slave station 3A is able to communicate with the host station 1. A predetermined code number is set in the communication I/F circuit 7 of slave station 3A by operation of the dip switch 8, in a manner known in the art. This number uniquely identifies the slave station, in accordance with its order "m" in the frame with respect to all other slave stations.

Referring now to FIG. 7, the receiving circuit 11 shapes the waveform of the signal of the serial data column sent from the host station 1 and having the transmission frame format shown in FIG. 8. The data counting circuit 12 counts the number of bits thereof, so that the count number can be outputted to the comparing circuit 14 successively, and passes the unaltered serial data column on to decoding circuit 15. The computing circuit 13 computes the code value, using equation (1), the number n of bits of data allocated to each station in the frame and the code number "m" predetermined by the dip switch 8. The code value is output by computing circuit 13 and that value is compared with the count number of the bits of serial data counted by the data counting circuit 12 in comparing circuit 14. If these values do not coincide, the data sent from the host is simply passed on through a transmission circuit 21 in synchronism with the serial data as received from the host, and is sent directly to the next junction box 2B. If the data count number and the code value do coincide with each other, the coincidence signal is outputted from the comparing circuit 14 to the data decoding circuit 15. In response, the serial data decoded into n-bit parallel data by the circuit 15 are outputted via the output circuit 16 and the level conversion and output interface circuit 17. In this manner the parallel data addressed to slave station 3A is output at interface circuit 17 onto the internal bus (not illustrated) of the slave station 3A for processing in the slave station.

When the slave station 3A has data it wishes to communicate to the host 1, it places that data onto its internal bus for access by I/F circuit 7. Specifically, the parallel data that is an input signal to I/F circuit 7 is received at input circuit 19 through the input I/F circuit 18. The received parallel data is decoded into n bits of serial data by the data decoding circuit 20 and is synchronized with the serial data signal sent from the host station 1 by the transmission circuit 21 and sent to the next slave station 2B in the loop. The particular point in the transmission frame where the n bits are inserted will be determined by the output of coincidence circuit 14 to data encoding circuit 20.

As mentioned above, even though all the code numbers of the slave stations 3A, 3C, 3D are different from each other, only a predetermined order of data can be transmitted to the respective slave stations from the host station 1. Whenever a new slave station is added to the loop, its code number must be set to a number other than one presently being used on the loop. This often requires the code number to be changed every time the slave moves from system to system.

According to the conventional data communication method, since the code numbers set at each station must be unique, the code number of a new slave station must be checked and reset every time the slave station is moved and connected to another system. If the code number is not set accurately, it is impossible to receive normal data.

The present invention is directed to solving the aforementioned problem and has as its object the provision of a data-communication method which enables the connection of any slave station to any junction box without the need to check the code number of the slave station each time.

SUMMARY OF THE INVENTION

In the data-communication method according to the present invention, junction boxes are connected in series to data transmission lines, each junction box having a predetermined code number. A plurality of slave stations are detachably connected to the junction boxes. The method comprises the steps of:

outputting a code number signal, indicating the predetermined code number, from the junction box to the slave station when communicating with a host station;

inputting the code number signal outputted from the junction box into the slave station;

receiving a serial data signal transmitted from the host station at the slave station and selecting for input a data section, corresponding to the predetermined code number, of the serial data signal so as to generate input data; and transmitting output data by superimposing output data onto the serial data signal.

In the present invention, a code number signal indicating a predetermined code number is outputted from the junction box. The code number signal outputted from the junction box is inputted to a slave station detachably connected to the junction box. The serial data signal transmitted from the host station is received in the slave station. The data section corresponding to the code number of the serial data signal is input to form input data, and output data is transmitted by superimposing it onto the serial data signal at that data section.

BRIEF DESCRIPTIONS OF THE DRAWINGS

FIG. 3 is an illustration of a format of a data transmission frame in the embodiment shown in FIG. 1.

FIG. 8 is an illustration of a format of the conventional data transmission frame.

DESCRIPTION OF THE PREFERRED EMBODIMENTS

One embodiment employing a data-communication method of the present invention will be explained with reference to FIGS. 1 through 3. In these drawings, identical numbers and symbols are used to identify components that are the same as or correspond substantially to those in the conventional embodiment.

Figure 1:
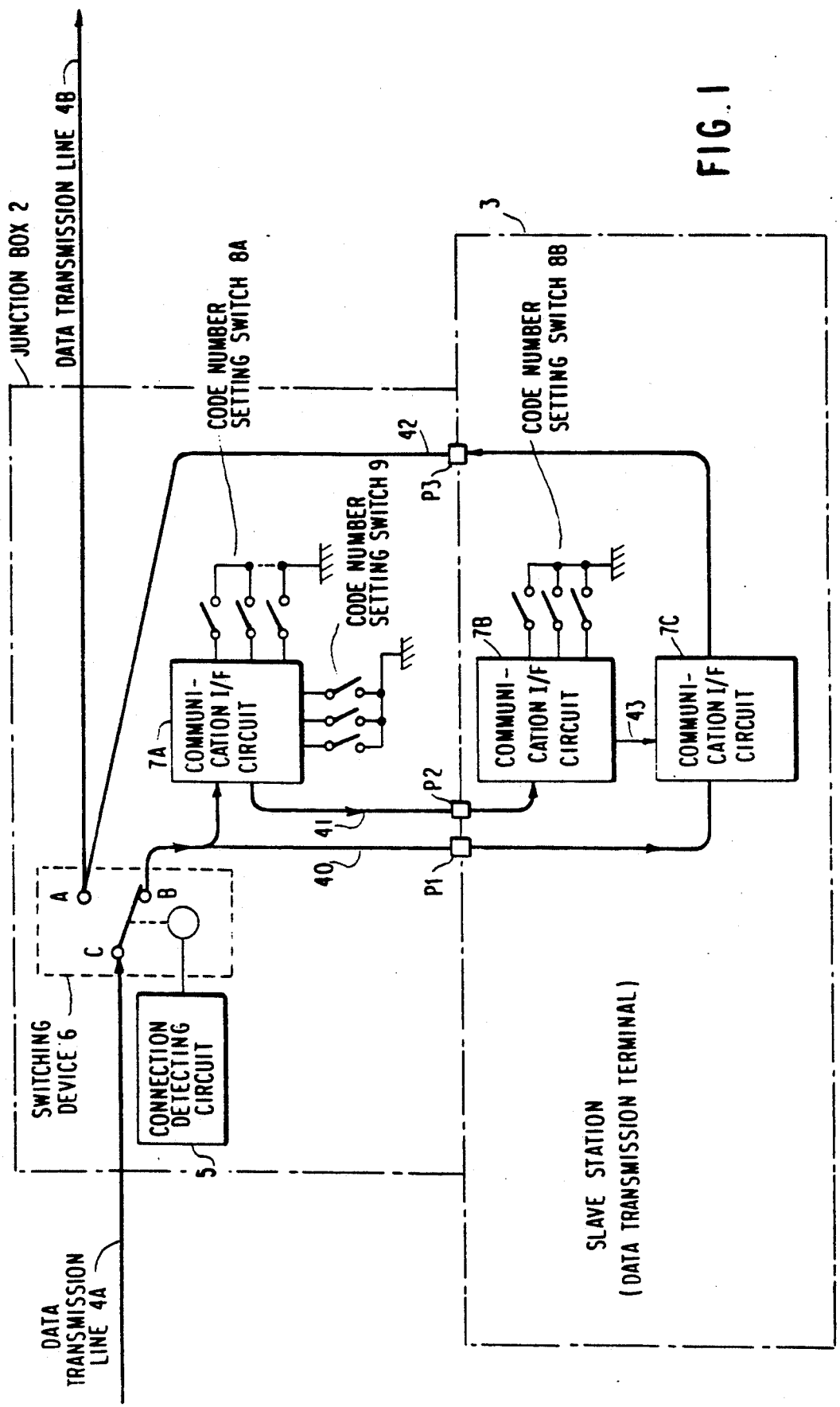
FIG. 1 is a schematic of the construction of a data-communication terminal portion of a slave station according to one embodiment employing a data-communication method of the present invention.
Figure 5:
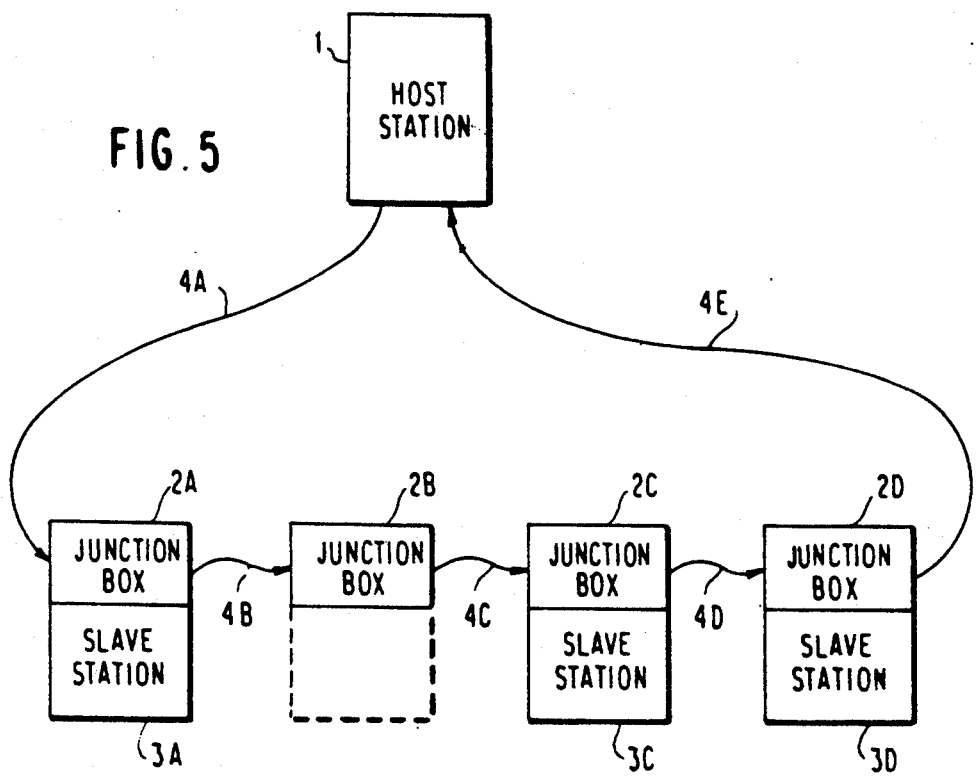
FIG. 5 is a block diagram showing a data-communication system to which the present method and the conventional method both apply.
Figure 6:
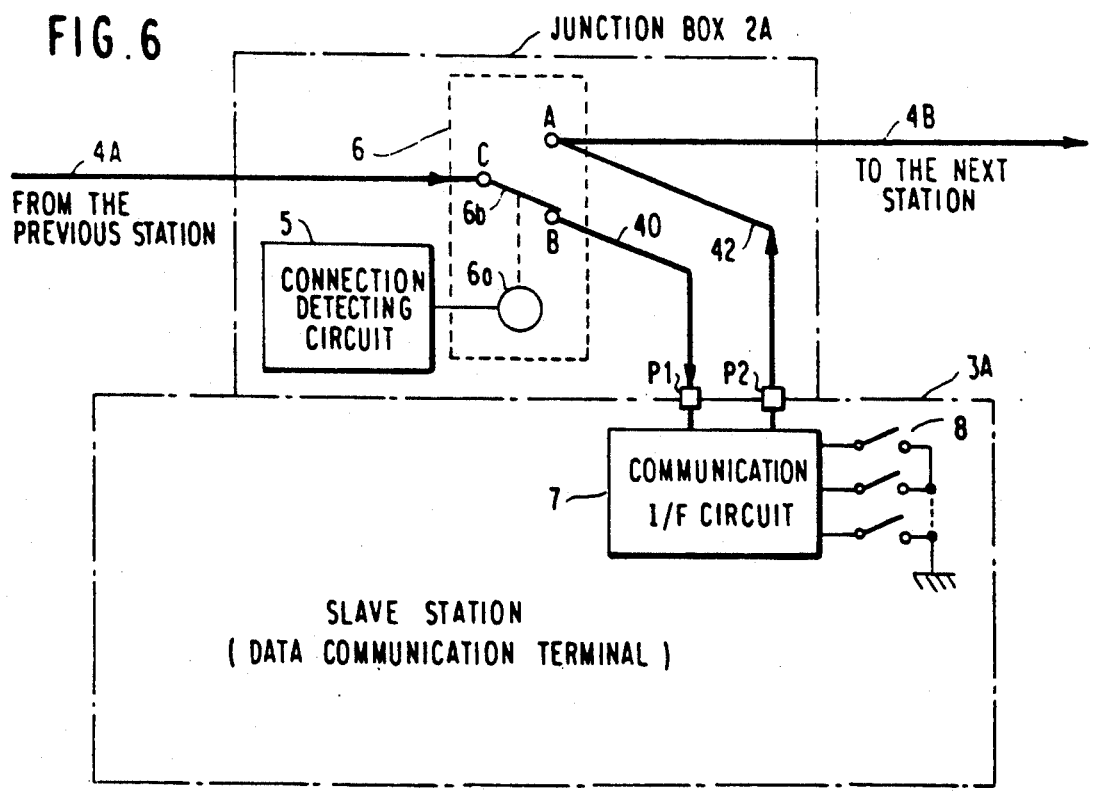
FIG. 6 is a schematic of a data-communication terminal employing the conventional data-communication method.

FIG. 1 is a view showing the construction of the data-communication equipment located at a node that forms a part of a loop-type architecture, as seen in FIG. 5, and is constructed in accordance with the present invention. The equipment comprises a junction box 2 connected in series between data transmission lines 4A and 4B, and a portable slave station (a data terminal) 3 connected to the junction box 2. The junction box is assigned a unique code number by operation of dip switch 9, as later explained. In FIGS. 1 through 3, a communication I/F circuit 7A, which is operative to generate a code number signal, is accommodated within the junction box 2. The code number could, for example, represent the sequential position "m" of that particular junction box in the loop-type architecture. The communication I/F circuit 7A converts the code number set by the code number setting switch 9 into a code number signal in serial data form. Circuit 7A receives the serial data column transmitted by the host and outputs the code number signal on line 41 in synchronism with the host transmission. The host station transmission also appears on line 40, connected to plug P1. The code number signal output from I/F circuit 7A onto the data transmission line 41 is input to plug P2. A code number setting switch 8A, such as a dip switch, sets a first provisional code number for the communication I/F circuit 7A, for example, switch 8A could be set to the code number "1".

The junction box 2 also comprises a switch 6, which receives at terminal C the serial data signal transmitted from the host station 1 on line 4A. Switch 6 operates to connect terminal C to either terminal A or terminal B in response to the connection detecting circuit 5, which detects the connection of the slave station 3 to the junction box 2. Switching device 6 will switch the signals on data transmission line 4A directly to data transmission line 4B when no proper connection is detected and will switch transmission line 4A to the slave station 3 when it is properly connected to the junction box 2.

Within slave station 2 is a second communication I/F circuit 7B that receives the serial code number signal from I/F circuit 7A on line 41 and converts it to a parallel data signal. Communication I/F circuit 7B also receives a second provisional code number from code number setting dip switch 8B, which in the present example is the number 1, identical to the provisional code number for the communication I/F circuit 7A.

A third communication I/F circuit 7C, which is capable of receiving a serial data input on line 40 and transmitting a serial data output onto line 42, obtains the code number signal output from the communication I/F circuit 7B. I/F circuit 7C inputs that portion of the serial column of data transmitted from the host station 1 that corresponds to the code number input from I/F circuit 7B and outputs that data onto the internal bus within the slave station for processing. On the other hand, I/F circuit 7C will transmit output data from the slave station internal bus onto line 42 by superimposing it on and synchronizing it with the serial data signal from the host station.

Figure 2:
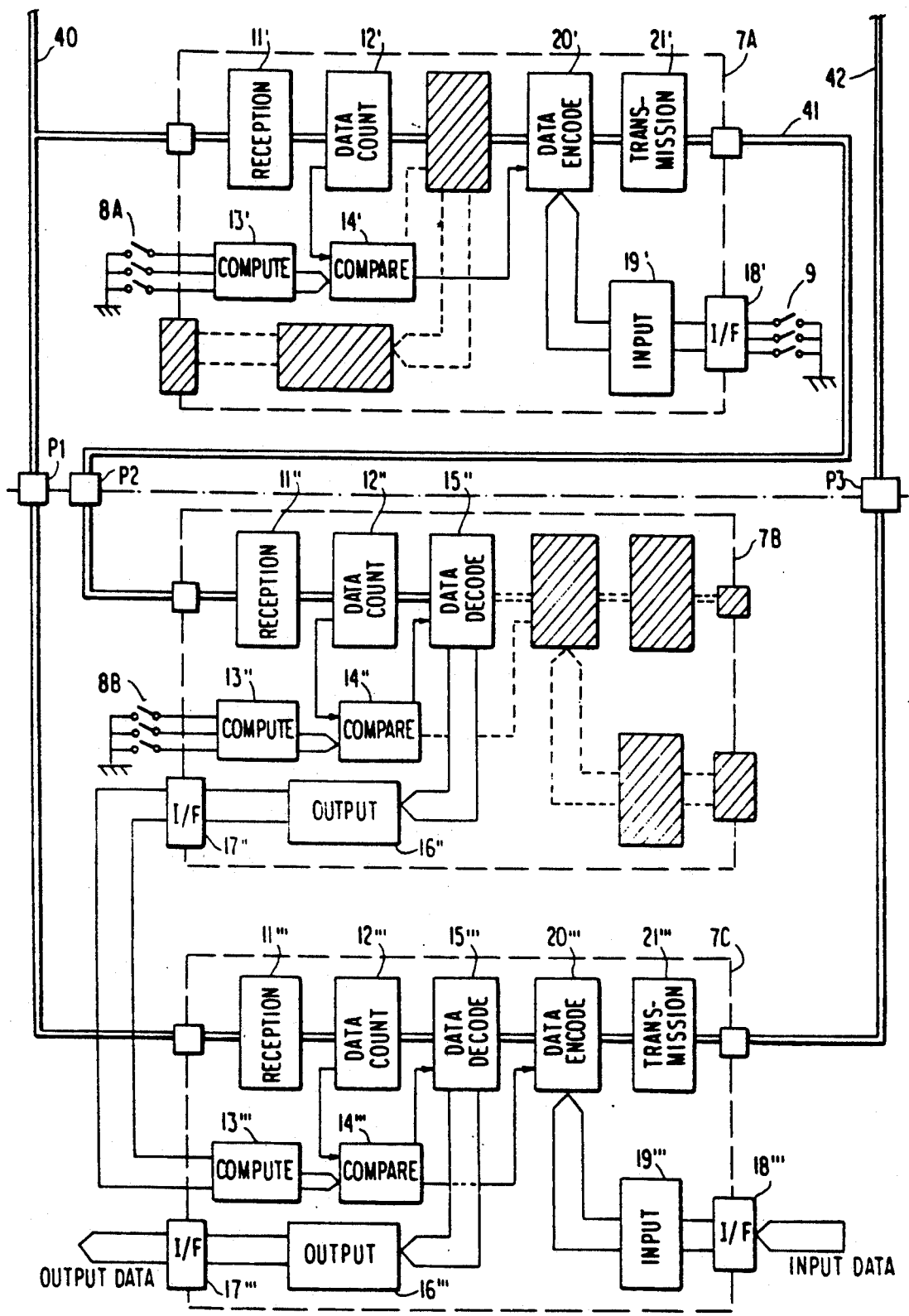
FIG. 2 is a schematic of the construction of and the connections of components within a main circuit portion of the data-communication terminal shown in FIG. 1.
Figure 7:
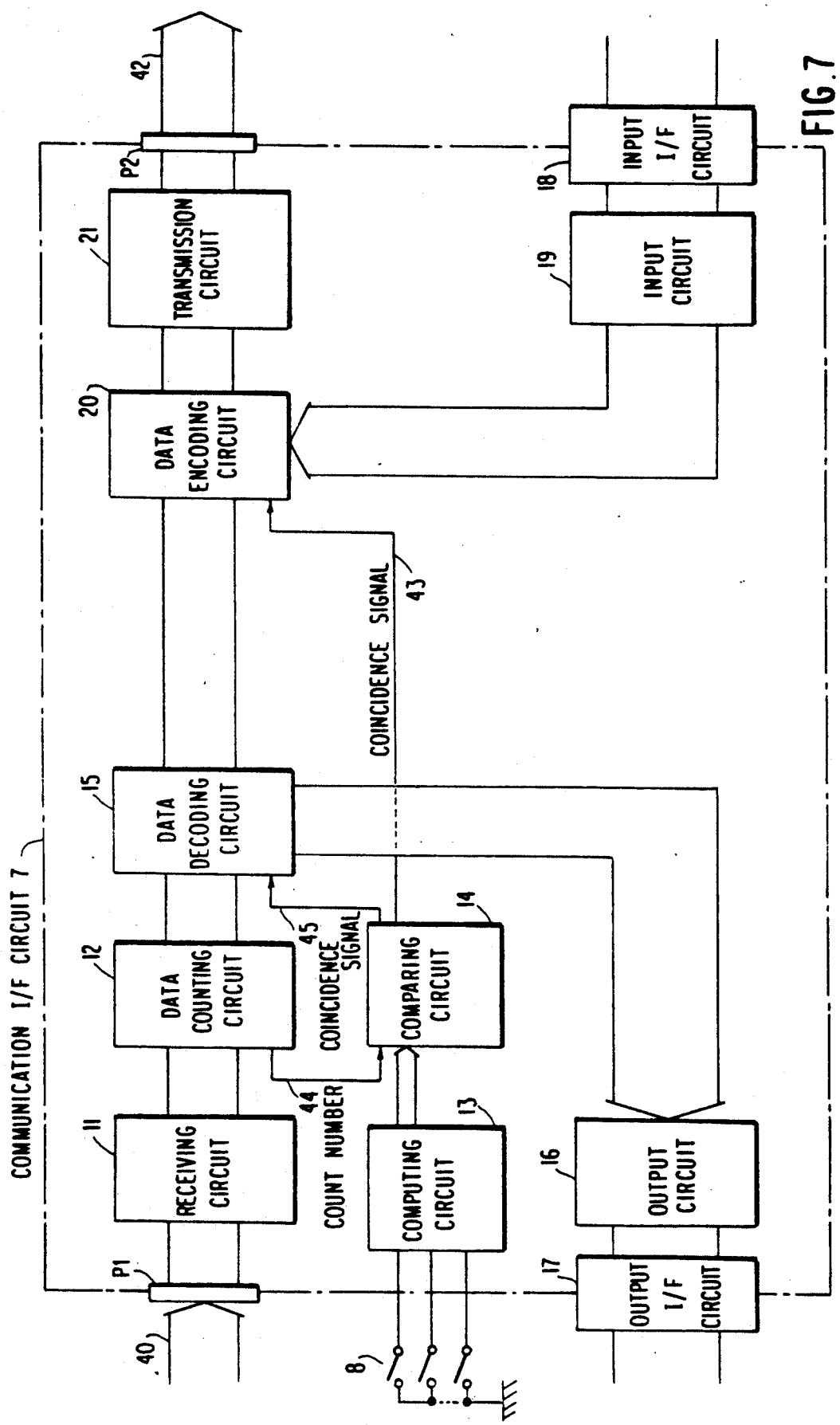
FIG. 7 is a block diagram showing a communication I/F circuit used in the conventional method.

FIG. 2 is a view showing the construction of the first communication I/F circuit 7A. This circuit functions as a code number signal source within the junction box 2, as shown in FIG. 1. Communication I/F circuit 7B functions as a code number signal source within the slave station 3 and the third communication I/F circuit 7C functions as the serial data transmitting and receiving means. In a preferred embodiment, all of the communication I/F circuits 7A, 7B, 7C may have the same internal construction as the communication I/F circuit 7 shown in FIG. 7, and are constructed using integrated gate array techniques. This "modularity" of the circuits 7A-7C allows significant cost savings. However, not every one of the circuits 7A-7C needs all of the various internal components 11-21, because the purpose of each circuit 7A-7C is somewhat different. Therefore, although the gate arrays forming circuits 7A-7C are basically identical, slight variations may be made to disable ones of the various internal components. The active components and their connections as well as the details of the operation of each of these circuits in combination will be described subsequently. At the moment, it is sufficient to note that the inactive components in each I/F circuit are identified by hatching and the inactive connections by dotted lines. Similar components in each I/F circuit have the same reference number but are identified in each respective circuit 7A, 7B and 7C with prime superscripts ', " and "', respectively.

FIG. 3 shows a data transmission frame to be transmitted from the host station 1 for the case where serial data communication is carried out among the host station and a plurality of slave stations. The frame comprises a code number area 30, comprising "n" bits as a leader and a data area comprising "m" slots of "n" bits each, the slots being assigned to communications for particular stations. The bit number n may be set freely, for example to n=11.

Turning now to the operation of the data-communication equipment employing the data-communication method of the present invention, with reference to FIGS. 1 through 3, a clear understanding of the invention may be obtained.

In FIG. 1, when the slave station (the data communication terminal) 3 is not connected to the junction box 2, the contact point of the switching device 6 of the junction box 2 is kept in contact with terminal A so that the transmission line 4A is directly connected from the node immediately upstream of the junction box 2 to the node immediately downstream of the junction box. When the slave station 3 is properly connected to the junction box 2, the connection of the slave station is detected by means of the connection detection circuit 5 and the switching device 6 is actuated by the output of circuit 5 and changes over the contact point to operatively connect the data transmission line 4A to the slave station 3. The changed-over data transmission line is divided, with one transmission path going to the data communication I/F circuit 7A in junction box 2 and the other path 40 going to the slave station 3.

In FIG. 2, the code number signal in parallel data format is output by interface circuit 18', using the code number set by the code number setting switch 9. This code number which may be the number "m" representing the mth position of the junction box in the loop, serves to identify the address of the slave station 3 that is to be attached to the junction box 2. For example, the code number, which eventually will be output to the slave station 3 by means of the method to be later explained, is input to the input I/F circuit 18' and input circuit 19' in the communication I/F circuit 7A. The code number signal in parallel format is converted to serial data by means of the data encoding circuit 20' for synchronized transmission onto line 41. A provisional code number, for example the code number "1" is also input to the communication I/F circuit 7A within the junction box 2 by means of the code number setting switch 8A. The provisional code number is essentially a frame address which is different from the predetermined code number of the slave station 3, input from circuits 9, 18', 19'. The parallel signal indicating the provisional code number is input to the computing circuit 13' of the communication I/F circuit 7A which computes a code value in accordance with Equation (1), i.e. code value=(code number−1)×n+1. In the present example, the provisional code number was set to 1 and the result of the computation is thus equal to 1. This computed code value provides one input to the comparing circuit 14'. In a manner previously described with respect to FIG. 7, the bits of the serial data signal received by the receiving circuit 11 from the host station through the data transmission line 40 are counted by means of the data counting circuit 12'. The count value is provided as a second input to the comparing circuit 14'. This count value input is changed successively as each additional bit is counted by counter 12'. When the count value coincides with the value computed by the computing circuit, the comparing circuit 14' inputs the coincidence signal to the data encoding circuit 20'. The decoding circuit (15) in I/F circuit 7A is not active to extract data from the host bit stream and, thus, no input is sent there from comparison circuit 14'. (Accordingly, the decoding circuit is shown in hatching the input from 14' and the output to what would be output circuit 16' are shown in dotted form). As mentioned above, the comparing circuit 14' outputs the coincidence signal at an appropriate point during the concurrent input of the serial data signal from the host station 1. Because the computation result the computing circuit 13' is 1 in the present example, the data encoding circuit 20' immediately converts the code number signal, input as parallel data from input I/F circuit 18' and the input circuit 19' and set by means of code number setting switch 9, to serial format at the moment that the coincidence signal 1 from circuit 14' is received. The converted serial data is superimposed by means of the transmission circuit 21. onto the leading code number area 30 in the data transmission frame of the serial data signal transmitted from the host station 1, as shown in FIG. 3, and is synchronized therewith so as to be output onto the data transmission line 41.

In the above example, because the provisional code number of the data communication I/F circuit 7A had been set to 1, the code number signal, indicating the predetermined code number from switch 9, can be placed into the code number area 30 shown in the data transmission frame in FIG. 3 as code number data. The serial code number signal, put into the data transmission frame and transmitted on line 41, is received by means of the receiving circuit 11 of the data communication I/F circuit 7B of the slave station 3.

The same provisional code number (e.g., "1") as the code number of the data communication I/F circuit 7A within the junction box 2 is set in the data communication I/F circuit 7B by means of the code number setting switch 8B. In the data communication I/F circuit 7B, the serial data signal sent from the data communication I/F circuit 7A of the junction box 2 through the data transmission line 41 is input to the receiving circuit 11" of the data communication I/F circuit 7B, where the waveform thereof is shaped. The bit number of the shaped serial signal is kept track of by means of data counting circuit 12" and the count value is outputted successively to the comparing circuit 14". As previously noted, in the present example, the same provisional code number used as an input to communication I/F circuit 7A is set in the communication I/F circuit 7B by means of the code number setting switch 8B. This parallel code number signal is input to the computing circuit 13" of the communication I/F circuit 7B, and a code value is computed using Equation (1) where code value=(code number−1)×n30 1. As a result of this computation, using the provisional code number of 1, the resultant code value 1 is inputted in the comparing circuit 14". Therefore, when the serial data signal transmitted from the host station, through I/F circuit 7A, is received at I/F circuit 7B, and the count of 1 is detected, a coincidence signal is outputted from the comparing circuit 14" to the data decoding circuit 14". As a result, the data decoding circuit 14" will take in the serial data at the code number area 30 located at the leader of the serial data signal and convert it to parallel data. The parallel data will comprise a code number signal indicating the predetermined code number originally input to I/F circuit 7A by switch 9.

The code number signal in parallel data format is output by means of the output circuit 16" in the communication I/F circuit 7B, level conversion and the like are carried out by means of the output I/F circuit 17", and the code number signal is inputted in parallel to the computing circuit 13'" of the communication I/F circuit 7C.

The communication I/F circuit 7C receives the serial data signal transmitted from the host station 1 through the data transmission line 40 in the same manner as in the conventional embodiment, selecting data from the bit stream in accordance with a code number signal indicating a predetermined code number, which in this case is inputted from the I/F circuit 17" of circuit 7B. In response to the output of comparison circuit 14''', data decoder 15''' selects the data section corresponding to the code number as input data, converts it into parallel data and outputs it onto the internal bus (not illustrated) in the slave station 3 via output circuits 16''' and 17'''. Also, in response to the output of comparison circuit 14''', data encoder 20''' converts parallel data received from the slave's internal bus via circuits 18''' and 19''' and the like to serial data to generate output data and superimpose it onto the serial data signal of the host station 1. The resulting serial data stream is transmitted to the next station through the data transmission line 42 after synchronization.

In the above embodiment, the predetermined code numbers corresponding to the respective junction boxes and set by switches 9 are usually set to an integer code number of 2 or higher. This convention is applied because the code number 1 is set as the common provisional code number for every junction box and the code number area 30 is provided in the data area corresponding to the code number 1 in the data transmission frame shown in FIG. 3.

In the above embodiment, the code number area 30 provided in the leading portion of the data transmission frame has the same number of bits "n", as that of each data area 31, and the code numbers corresponding to the respective junction boxes are set to a number not less than 2. However, it is not necessary to limit the code number corresponding to the respective junction boxes to a number not less that 2 since, but setting the bit number of the code number area 30 to a free number and setting the arithmetic form of the computing circuit 13''' in the communication I/F circuit 7C of FIG. 2 to 1+(code number −1)×n+1, other numbers can be accommodated.

Further, although the above-mentioned embodiment employs a dip switch as the code number setting device 8A or 8B, the code number setting devices are not limited to dip switches. The setting devices serve to set the provisional code numbers of the communication I/F circuits 7A, 7B to the same set value, for example to 1, and the value is not subsequently changed. In practice, the function provided by the dip switch may be offered by an equivalent circuit hard wired on a printed board so as to attain the same effect.

Figure 4:
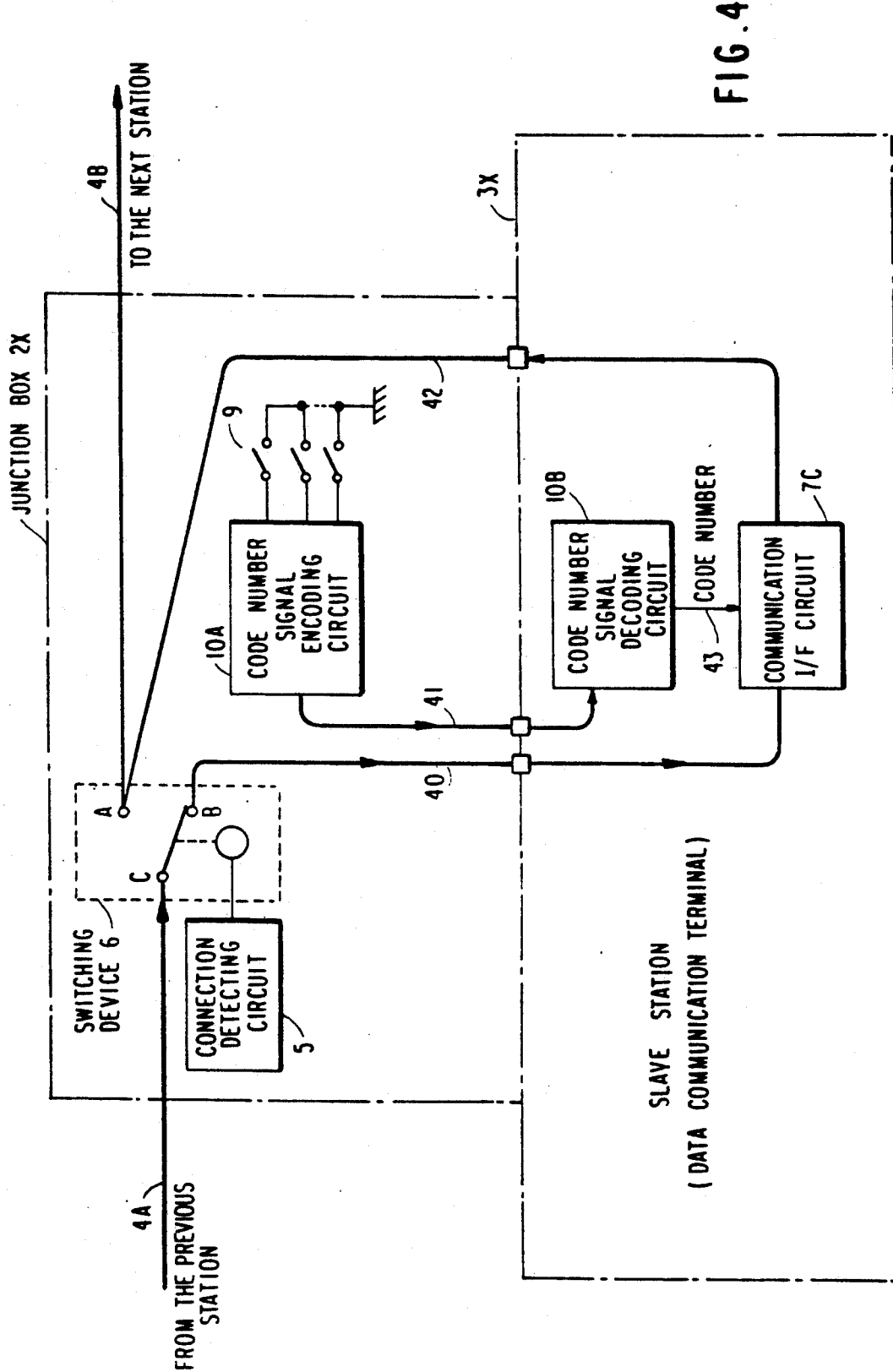
FIG. 4 is a schematic of a data-communication terminal according to another embodiment employing a data-communication method of the present invention.

FIG. 4 illustrates an alternative embodiment of the present invention. Illustrated are the construction of a junction box 2X and a slave station 3X in a data communication system having loop-type architecture shown in FIG. 5. If there is no provision for a code number area in the data transmission frame illustrated in FIG. 3 which identifies the serial data signal transmitted from the host station 1, the code number must be provided from the junction box 2X to the slave station 3X by a means different from the data transmission frame. In FIG. 4, a code number signal encoding circuit 10A which is accommodated within the junction box 2X, generates a code number signal, converts the signal indicating the code number set by the code number setting switch 9 to serial data and outputs the code number signal as serial data on line 41. A code number signal decoding circuit 10B which is accommodated within the slave station 3X, receives the code number signal inputted as serial data, converts it to parallel data and outputs the code number signal as parallel data to the communication I/F circuit 7C. The code number signal encoding circuit 10A outputs a code number signal as serial data indicating the predetermined code number which previously was set by the code number setting switch 9 accommodated within the junction box 2X. The code number signal decoding circuit 10B converts the code number signal from serial data inputted through the data transmission line 41 into parallel data and outputs the code number signals as parallel data to the communication I/F circuit 7C.

The communication I/F circuit 7C has the same construction as that shown in FIGS. 1 and 2 and will function similarly. The output on line 43 would be received by computation circuit 13''' in circuit 7C. Also, circuit 7C takes in the data section of the host bit stream corresponding to the code number to form input data, superimposes output data onto that data section, synchronizes the output data in the appropriate slot and transmits to the next station through the data transmission line 42.

Since the above-mentioned embodiment does not make use of the serial data signal transmitted from the host station when the predetermined code number is transmitted from the junction box 2X to the slave station 3X, it is not necessary to provide the code number area in the data transmission frame, as with the embodiment shown in FIGS. 1 and 2, and it is thus possible to shorten the data transmission frame.

As noted above, according to the present invention, it is possible to provide a data-communication method having the following advantages. With the communication carried out between the host station and the slave stations based on a predetermined code number outputted from the junction box and inputted into the slave station, the amount of wiring between the slave stations and the host station can be comparatively decreased. Further, it becomes unnecessary to reset the code number in the slave station when the slave station is detached from the junction box and connected to other junction boxes so that missetting of the code number can be prevented.

While the present invention has been disclosed with respect to specific embodiments, it is not intended to be limited thereto and the full scope of the invention is set forth in the appended claims.

What is claimed is:

1. A data-communication method for a loop-type network having a host station connected in a series loop with a plurality of nodes via data transmission lines, and being operative to generate a serial data frame comprising a plurality of data sections, each node having a junction box that is operative to detachably connect any one of a plurality of slave stations into the network, the method comprising the steps of:
   assigning a predetermined unique code number to each junction box as a station address,
   outputting a code number signal, comprising said predetermined code number, from the junction box to an associated slave station when a slave station is connected to said junction box;
   inputting the code number signal output from the junction box into said slave station; and
   receiving at said slave station a serial data frame transmitted from the host station and detecting at least one data section corresponding to the predetermined code number output from said junction box.

2. The method of claim 1 wherein said outputting step comprises retransmitting said serial data frame with said code number inserted into one of the data sections.

3. The method of claim 2 further comprising:

assigning an identification code to each said junction box, said identification code specifying a section of said serial data frame in which said predetermined code number is to be inserted.

4. The method of claim 3 wherein said identification code is input to both said junction box and said slave station connected thereto.

5. The method of claim 1 wherein said inputting step comprises directly inputting the code number signal from said junction box to said slave station via a path separate from said serial data transmitted from said host station.

6. The method of claim 1 further comprising the step of obtaining input data from said detected data section and retransmitting the serial data frame including output data in the data section corresponding to said predetermined code number.

* * * * *